UNITED STATES PATENT OFFICE.

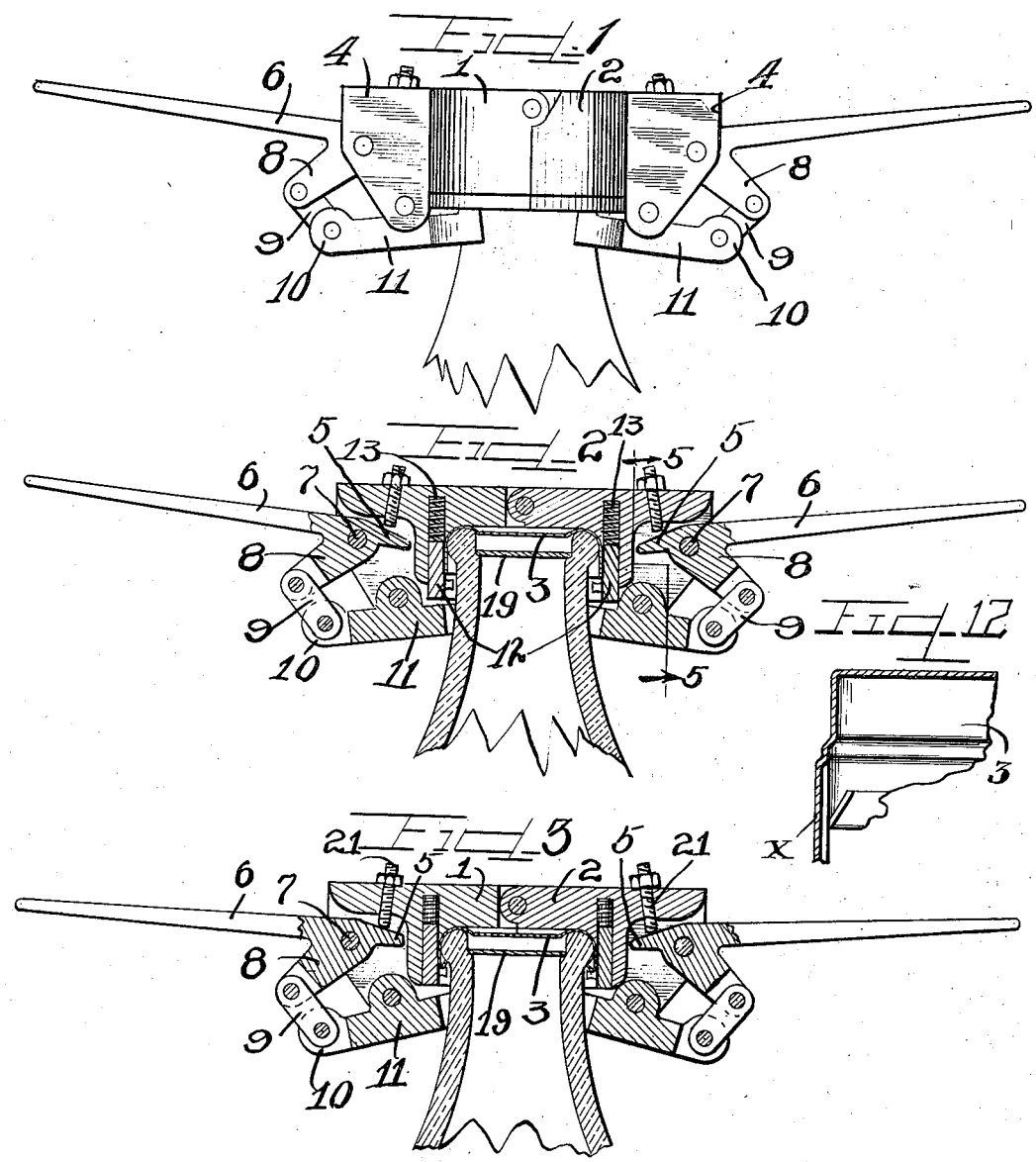

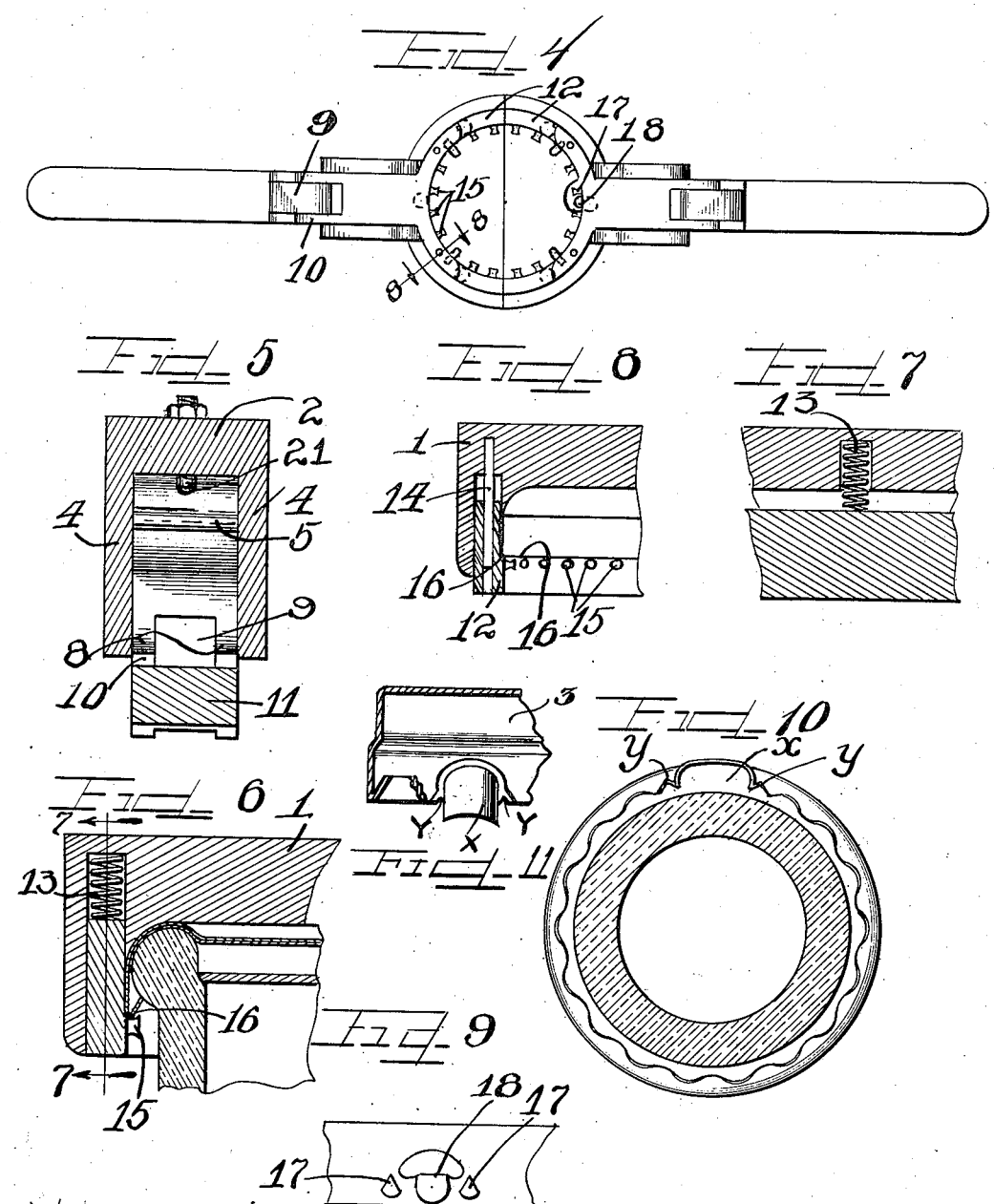

GUSTAVE LIDSEEN, OF CHICAGO, ILLINOIS.

SEALING TOOL OR CHUCK FOR BOTTLES.

1,128,254.    Specification of Letters Patent.    Patented Feb. 9, 1915.

Application filed August 15, 1912. Serial No. 715,156.

*To all whom it may concern:*

Be it known that I, GUSTAVE LIDSEEN, a citizen of the United States, and a resident of the city of Chicago, in the county of Cook and State of Illinois, have invented certain new and useful Improvements in Sealing Tools or Chucks for Bottles; and I do hereby declare that the following is a full, clear, and exact description of the same, reference being had to the accompanying drawings, and to the numbers of reference marked thereon, which form a part of this specification.

This invention relates to improvements in bottle sealing chucks of that class set forth in my prior application for patent therefor, filed on the 30th day of August, 1911, Serial No. 646,945. The construction illustrated in said former application, embodies the hinged chuck members, each carrying two arms or levers adapted to be gripped by the hands to operate the device in sealing, necessitating the use of the gripping pressure exerted by the hands, and necessitating considerable strength of grip.

The object of this invention is to afford a construction whereby the chuck is applied and operated by direct downward pressure, and without the necessity of exerting a gripping pressure in sealing.

The invention also has for its object a construction in which the gripping action is limited to prevent undue pressure being exerted upon the bottle or sufficient to injure the sealing cap.

The invention is illustrated in the drawings, and is hereinafter more fully pointed out and defined in the appended claims.

In the drawings: Figure 1 is a side elevation of a device embodying my invention, showing the same applied ready for sealing. Fig. 2 is a central section thereof, illustrating the position of parts before the application of sealing pressure. Fig. 3 is a similar view, illustrating the closing of the seal. Fig. 4 is a bottom plan view of the same. Fig. 5 is an enlarged section taken on line 5—5 of Fig. 2. Fig. 6 is an enlarged, fragmentary detail section illustrating the closing of the seal. Fig. 7 is a section on line 7—7 of Fig. 6. Fig. 8 is an enlarged fragmentary detail section on line 8—8 of Fig. 4. Fig. 9 is an enlarged fragmentary detail illustrating the cutting and crimping means for affording the preliminary tearing section in the cap. Fig. 10 is a section taken through the bottle neck below the sealing cap after the removal of the chuck, and showing the bottle sealed. Fig. 11 is a fragmentary view of a cap showing an offset in the walls thereof. Fig. 12 is a fragmentary sectional view of a cap showing the side wall cut and projecting outwardly at one point.

As shown in the drawings: 1 and 2, indicate semi-circular chuck members, hinged together along a central line, and each shaped on its interior to fit to the mouth of a bottle and to press the sealing cap 3, in place thereon. Said chuck members are provided on diametrically opposite sides of each other with integral outwardly extending brackets 4, cored on the under side to receive thereinto the inwardly projecting ends 5, of levers, the outer ends 6, of which are the hand levers whereby the device is operated. Said levers are fulcrumed in said brackets by means of fulcrum pins 7. Integrally connected with each of said levers, and extending obliquely outwardly and downwardly from the fulcrum pin 7, is a slotted arm 8, at the extremity of which is articulated a link 9, which at its other end engages in the slotted end 10, of a lever 11, fulcrumed in said bracket and projecting inwardly and affording a yoke at its opposite extremity to fit partly around the bottle neck.

Seated in each of the semi-circular chuck members 1 and 2, in a semi-circular groove provided therefor, is a sliding chuck member 12, comprising a half ring. The sliding chuck members 12, carried by said semi-circular chuck members when the chuck is closed, form a substantially continuous ring about the neck of the bottle. Springs 13, are seated in suitable recesses in the semi-circular chuck members to bear downwardly on said sliding chuck members 12, to hold the same at the downward limit of travel, and, as shown, a pin 14, extends through a suitable aperture in each sliding chuck member and into a suitable socket therefor in the semi-circular chuck members 1 and 2, respectively, to hold said chuck members at all times in proper relation, though permitting free relative movement outwardly and inwardly of the sliding chuck members with respect to the semi-circular chuck members.

Seated in the inner periphery of the sliding chuck members 12, are pins 15, the heads of which project radially inward and are concave on their upper sides to receive the edge of the sealing cap, and crimp the same inwardly, and to facilitate such inward bending of the sealing cap, an offset or shoulder 16, is provided in each of said sliding chuck members tending to incline the edge of the cap inwardly when the sealing tool is applied thereto.

As shown, means are provided also for starting a tearing portion at the edge of the sealing cap. For this purpose, as shown, inwardly and upwardly projecting angular points 17, affording knives are provided in one of the sliding chuck members 12, substantially in a line with its operating handle or lever, and between the two knives 17, is an outwardly projecting lip 18, adapted to engage the edge of the cap between said two knives, and to deform the same slightly outwardly and upwardly to permit of ready insertion of an opening tool therebeneath, as illustrated at X, in Fig. 10, the cuts formed by said knives being indicated by Y, in the same figure.

The operation is as follows: The bottle, shown as the ordinary milk bottle provided with the usual shoulder on which may be laid a paraffin or other suitable stopper 19, has first applied thereto the soft metal or other suitable sealing cap 3, having the mantle or peripheral flange thereof extending well down over the head of the bottle neck. The sealing tool is lifted by its handles 6, and applied over the top of the bottle and seal, as shown in Figs. 1, 2 and 3. The handles are now forced down, as shown in Fig. 3, forcing the ring composed of the sliding chuck members 12, upwardly by engagement of the yoked end of the levers 11, therebeneath, as shown in Figs. 3 and 4, such upward movement of said ring bringing the projecting heads of the pins 15, into engagement with the mantle of the seal, and rolling the same inwardly and upwardly into positive engagement beneath the bead of the bottle neck. Such inward rolling is assisted by the offset 16, and the caps preferably are formed with a peripheral deformation or offset adjacent to, or slightly above the offset 16, so that the closing of the seal preparatory to applying the pressure thereon, acts to tip or incline the edge of the sealing cap inwardly. With the closing of the seal, the knife points 17, and the lip 18, engaging the mantle at one side thereof, effects a deformation therein, said knife point starting an incipient cut in the metal, or creasing the same preparatory to tearing, while the lip or projection 18, acts to roll the same outwardly, affording a recess therebeneath as indicated at X, in Fig. 10, to permit the ready insertion of a tool, or other suitable appliance for tearing the cover sufficiently to permit of ready removal.

It is to be observed that the springs 13, are sufficient to force the annular chuck members downwardly and to elevate the levers 6, thus retracting the levers. However, as the device normally is elevated by its levers, the release is positive, as evidently the gravity of the relatively heavy chuck carried on said levers insures the full opening before leaving the neck of the bottle. As shown, adjustable top screws 21, are inserted through each of the brackets 4, to bear against the extended inner ends 5, of said levers, serving to limit the throw thereof in sealing, and preventing such pressure being applied at any time as could by any possibility injure either the seal or the bottle.

Of course, details of the construction may be varied. I have shown but a preferred form of my invention, and I therefore do not purpose limiting the patent granted on this application, otherwise than necessitated by the prior art.

I claim as my invention:

1. In a device of the class described articulated semi-circular chuck members, toggle levers fulcrumed on the side of each, the innermost yoked to fit about a bottle neck, chuck members slidably engaged in the semi-circular chuck members and engaged by said yoked levers whereby downward pressure on said levers acts through the toggled connections to force the latter chuck members and semi-circular chuck members oppositely, and pins in the latter chuck members adapted to engage beneath the mantle of a sealing cap and to crimp the same inwardly and upwardly around a bottle neck to which the seal is applied.

2. In a device of the class described embracing a sealing tool for bottles having a beaded neck embracing hinged chuck members, arc shaped chuck members slidably engaged therein, oppositely acting levers fulcrumed on said hinged chuck members, actuating levers, links connecting the same whereby downward pressure on the actuating levers acts to throw the other of said levers oppositely to move the arc shaped chuck members toward each other, springs holding said levers normally retracted, and cutting points in one of the latter chuck members adapted to mutilate the mantle of the sealing cap to start an incipient tear therein.

3. A tool for applying sheet metal sealing caps to bottles embracing coacting chuck members acting oppositely on the seal and simultaneously to press the seal into place and to roll and crimp the edges upwardly beneath the bead on the bottle neck, knives in one of said chuck members adapted to mutilate the mantle of the sealing cap, and a projection between the knives acting to deform said mantle to permit the partial insertion of an opening tool.

4. A device of the class described embracing a tool adapted to crimp a bottle sealing cap onto, around and beneath the bead on the bottle neck, knives thereon adapted to mutilate the mantle of the sealing cap, and a projection adapted to deform said mantle between the mutilations afforded by the knives to bend the same inwardly affording a recess for the insertion of an opening tool.

5. A sealing device for bottles embracing a chuck adapted to engage a sealing cap in place upon the bottle neck, movable deforming means in connection therewith, knives thereon adapted to afford closely adjacent incisions in the mantle, and a lip on said means to roll a deformed portion of the mantle outwardly to permit of ready insertion of a tool for tearing the cap from place.

6. A device of the class described comprising articulated chuck members, handles pivoted thereon, cranks integral therewith, adjustable means coacting with one of the same to limit the movement of said handle, pivoted yokes linked to another of said cranks to be actuated thereby by movement of said handles, and means slidable in said chuck members actuated by said yokes to coact with said members in sealing the cap on a bottle.

7. A device of the class described comprising articulated chuck members, sealing means slidable therein and coacting therewith, actuating handles pivoted on said chuck members, and toggle connections between the same and said sealing means to actuate the latter.

8. In a device for forming seals for bottles comprising articulated jaws, handles pivoted thereto, a plurality of arms integral with each handle, screws threaded in said chuck jaws adapted to contact one of the arms of each handle to limit the movement of said handle, spring pressed sealing members slidable in said jaws, and toggle links connected to another of the arms of each handle adapted to support said sealing members.

9. In a device of the class described a pair of articulated chuck members adapted to open back to back, handles pivoted thereto adapted to open said chuck members for insertion over a bottle, spring thrust sealing jaws slidable in said chuck members adapted to deform a bottle seal, and toggle levers connected to said handle and to said sealing jaws to actuate the latter inwardly toward said chuck members with the closure of said chuck members over said bottle by means of said handles.

In testimony whereof I have hereunto subscribed my name in the presence of two subscribing witnesses.

GUSTAVE LIDSEEN.

Witnesses:
 CHARLES W. HILLS, Jr.,
 A. R. MEYER.